United States Patent [19]

Brym

[11] Patent Number: 5,227,053
[45] Date of Patent: Jul. 13, 1993

[54] WATER PURIFICATION SYSTEM

[75] Inventor: Stanley J. Brym, Torrington, Conn.

[73] Assignee: Conventure Corporation, Westport, Conn.

[21] Appl. No.: 620,034

[22] Filed: Nov. 30, 1990

[51] Int. Cl.[5] .................................. B01D 15/00
[52] U.S. Cl. .................. 210/143; 210/202; 210/206; 210/255; 210/260; 210/261; 210/262; 210/266; 210/284; 210/282; 210/474; 210/748; 210/665; 210/667
[58] Field of Search .............. 210/748, 763, 202, 669, 210/255, 260, 261, 262, 266, 283, 209, 205, 206, 284, 282, 474, 665, 667, 143

[56] References Cited

U.S. PATENT DOCUMENTS

| | | | |
|---|---|---|---|
| 677,773 | 7/1901 | Burbridge | 210/266 |
| 745,754 | 12/1903 | Adams | 210/262 |
| 1,166,802 | 1/1916 | Albert et al. | 210/266 |
| 1,248,329 | 11/1917 | Hughes | 210/255 |
| 1,440,254 | 12/1922 | Travers | 210/255 |
| 1,657,822 | 1/1928 | Frechou | 210/255 |
| 2,167,225 | 7/1939 | Van Eweyk | 210/473 |
| 3,768,651 | 10/1973 | Streeter | 210/169 |
| 3,768,652 | 10/1973 | Jardim | 210/260 |
| 3,774,766 | 11/1973 | Brock | 210/169 |
| 3,901,806 | 8/1975 | Murchison | 210/763 |
| 3,996,136 | 12/1976 | Jakubek et al. | 210/262 |
| 4,297,222 | 11/1981 | Takeguchi et al. | 210/169 |
| 4,312,754 | 1/1982 | La Fontaine | 210/282 |
| 4,528,093 | 7/1985 | Winer | 210/96.2 |
| 4,544,488 | 10/1985 | O'Brien | 210/664 |
| 4,606,821 | 8/1986 | D'Imperio | 210/169 |
| 4,683,054 | 7/1987 | Turnbull | 210/96.1 |
| 4,692,246 | 9/1987 | Simon | 210/262 |
| 4,762,613 | 8/1988 | Snowball | 210/764 |
| 4,849,115 | 7/1989 | Cole et al. | 210/763 |
| 4,851,112 | 7/1989 | Schlensker | 210/261 |
| 4,863,608 | 9/1989 | Kawai et al. | 210/748 |
| 4,892,712 | 1/1990 | Robertson | 210/510.1 |
| 4,944,878 | 7/1990 | Lockridge et al. | 210/903 |
| 4,956,754 | 9/1990 | Chen | 210/169 |
| 4,966,665 | 10/1990 | Ibusuki et al. | 210/763 |
| 4,995,975 | 2/1991 | Jacquot et al. | 210/282 |
| 5,024,766 | 6/1991 | Mahmud | 210/748 |
| 5,026,477 | 6/1991 | Yen | 210/284 |

FOREIGN PATENT DOCUMENTS

PH7074 7/1987 Australia .
WO8902418 3/1989 Fed. Rep. of Germany .
2588548 4/1987 France .

Primary Examiner—Wilbur Bascomb, Jr.
Assistant Examiner—Cynthia L. Nessler
Attorney, Agent, or Firm—Jacobson, Price, Holman & Stern

[57] ABSTRACT

A point of use water purification system including a housing supporting an untreated water container, a removable and disposable filter means and a treated water receiving container all of which are self contained in relation to the housing to enable the housing to be supported from a countertop or other suitable surface at the point of use. The filter means includes multiple compartments with purification media therein with two of the compartments including plate means coated with a photoactivated catalyst, preferrably titanium oxide ($TiO_2$). An ultraviolet lamp and reflector directs ultraviolet light energy onto the catalyst. Flow control means is provided in the filter means to provide a slow rate of flow thereby providing long time contact between the water being treated and the purification media in the filter means to provide maximum purification efficiency. The water supply container is removable and refillable to provide a batch purification process well adapted for installation at a point of use in both domestic and industrial applications.

14 Claims, 5 Drawing Sheets

WATER PURIFICATION SYSTEM

BACKGROUND OF THE INVENTION

1. Field of the Invention

This invention relates to a point-of-use water purification apparatus for decreasing or eliminating certain harmful chemicals presently found in water supplies. This invention can be used in domestic, commercial and industrial applications where pure water is required.

2. Description of the Prior Art

There is a need for improved water purity for industrial use in laboratories, pilot plants and critical processes which must meet very demanding purity specifications.

Also, there is a need for improved water purity for domestic use for many reasons, including easier washing, decreased damage to plumbing fixtures, staining and general aesthetics. Drinking and food preparation are the primary concerns addressed here. The water must be biologically safe as well as free from harmful organic and inorganic compounds and chemicals.

The main approaches to purifying water are either to separate the water from the harmful compounds, leaving these compounds trapped in a filter, or to alter these compounds so that they no longer are harmful. There are a number of commercially available systems that are directed to these approaches for improving the water purity. Among these are distillers, reverse osmosis systems, fine filters, granulated activated carbon filters, ozone generators, ultraviolet lamps and some combinations of these techniques.

One important technology used in water purification is the photoactivation of a catalyst by means of ultraviolet light. U.V. activated catalysts are especially effective since they are able to both oxidize and reduce the most stable organic compounds. They are also effective in the oxidation and reduction of many inorganic compounds.

The water to be treated is made to flow over a catalyst irradiated with U.V. light of the appropriate wavelength. Many compounds will have a tendency to be adsorbed onto the catalyst surface. While being held there, they are under the influence of the chemical species that can actively combine with them. These chemical species either are already available in the water, as for example, dissolved oxygen, or are generated by means of U.V. light acting on the catalyst. Free hydroxyl radicals, electrons, and "positive holes" are examples of the latter. These active species are able to break or rearrange the chemical bonds of the molecules adsorbed onto the catalyst surface.

Many molecules will not be adsorbed onto the catalyst surface, but these, too, will be destroyed through the influence of the catalyst. Active species created at the catalyst surface can enter into the bulk of the water and there attack the target molecules. These target molecules can have their chemical bonds rearranged so that entirely new molecules are created. Large molecules can be progressively split and rearranged so that they are "mineralized" i.e., converted to $CO_2$, HCl and $H_2O$ or other neutralized or harmless substances. In a like manner, inorganic substances in an ionic form may also be rendered harmless.

The physical and chemical processes involved with U.V. activated catalysts have been the subject of intense investigation over the years. Studies in the past have demonstrated that natural sunlight in combination with a catalyst such as titanium dioxide can effect significant destruction of toxic organic chemicals.

U.S. Pat. Nos. 4,268,399 and 4,304,687 teach the use of a zinc titanate catalyst to purify organically polluted water. U.S. Pat. No. 4,892,712 discloses a purifier that uses U.V. irradiation to photactivate a metal semiconductor used as a catalyst. The anatase form of titanium dioxide ($TiO_2$) is disclosed as preferred but other metal semi-conductors such as ZnO, CdS, $WO_3$ and $SnO_2$ are also stated as being useful.

$TiO_2$ catalysts have been bound to several different substrates, e.g., glass, inside of a glass tube and to small glass beads. Serpone et al. describes how $TiO_2$ has been prepared and simultaneously embedded onto 3–4 mm glass beads by high temperature decomposition of titanium (IV) alkoxides in alcohol media, "Photocatalysis over $TiO_2$ Supported on a Glass Substrate", SOLAR ENERGY MATERIALS, 14:121–127 (North Holland Amsterdam 1986). The use of glass beads facilitated the subsequent separation of $TiO_2$ from the treated water. These glass beads were used many times over with no loss of $TiO_2$ from their surface and no apparent loss of catalytic properties.

Finally, R. W. Mathews, "Solar-Electric Water Purification Using Photocatalytic Oxidation with $TiO_2$ as a Stationary Phase", SOLAR ENERGY, 38:405–413 (1987), described the practical performance of $TiO_2$ on a domestic water supply. He found that due to certain impurities in this water, the photoactivity of the catalyst decreased by 33% after 1700 liters had been treated. After only 20 or 30 liters, evidence of a yellow-brown discoloration began to appear on the catalyst surface.

There are many operational and economic disadvantages associated with known water purification systems. The present invention maximizes the purification of water without introducing the disadvantages of current systems.

SUMMARY OF INVENTION

This invention is a water purifier intended for domestic or industrial use on a countertop. It consists of a housing supporting two bottles and a disposable filter cartridge. One bottle containing the water to be treated is positioned inverted over the filter cartridge. The water flows by gravity through the filter cartridge exiting into a collection bottle.

The filter is internally apportioned to contain several different types of purification media so that a wide range of water pollutants may be eliminated. Most of the media have been selected to target specific inorganic contaminants identified by the USEPA. The remaining media is not as selective and consists of activated carbon which can eliminate a broad range of organic compounds, as well as some inorganic compounds. In addition, there are two sections in the filter where a photoactivated catalyst is employed. This catalyst has strong oxidizing and reducing properties. In combination with the other media, it can enhance the elimination of certain refractory compounds. It can also, by itself, destroy many harmful organic and inorganic compounds as well as eliminate microorganisms such as bacteria and viruses.

The filter contains integral flow control orifices to establish a very low flow rate since the filtration process is intended to be a lengthy one for maximum effectiveness.

Two sections in the filter allow the water being treated to be exposed to atmosphere. This exposure oxygenates the water which aids in contaminant destruction. The addition of oxygen also improves the taste of the water. The exposure to atmosphere also allows volatile compounds present in the water to be driven off.

The housing contains the ultraviolet lamp that is used to irradiate the catalyst in the filter. The housing also contains electrical controls to operate the lamps and to count the number of times the purifier has been used so that a proper filter replacement schedule may be maintained.

By including the catalyst as a disposable component of the filter, one of the major drawbacks of catalytic systems is eliminated: catalytic activity may decrease due to contaminants, but there may be no visual change on the catalyst surface to indicate this. The user of this purifier is assured of a fresh catalyst with each filter change.

The present invention offers the advantage of several water purification technologies combined into a single replaceable filter.

DETAILED DESCRIPTION OF THE PREFERRED EMBODIMENT

Figure 1:
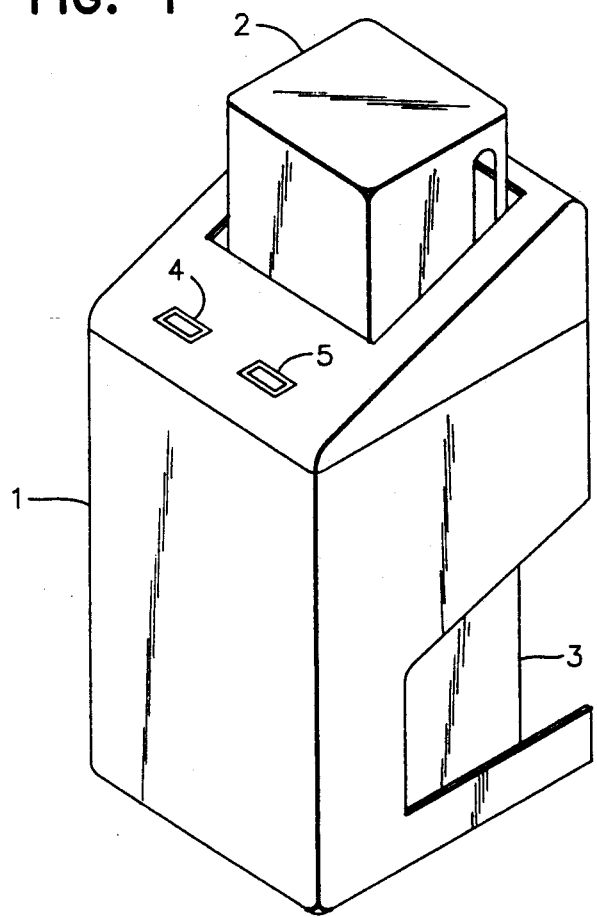
FIG. 1 is a front perspective view of the complete water purifier assembly.

Referring specifically to the drawings, FIG. 1 illustrates the complete water purifier assembly. The housing 1 encloses and supports a water supply bottle 2 and a water collection bottle 3. The upper slanted surface of the housing 1 contains an operating switch 4 and an indicator lamp. The indicator lamp 5 alerts the user that the filter is exhausted and in need of replacement. A suitable electrical supply cord (not shown) provided with a male plug enables the assembly to be connected to a conventional female socket.

Figure 4:
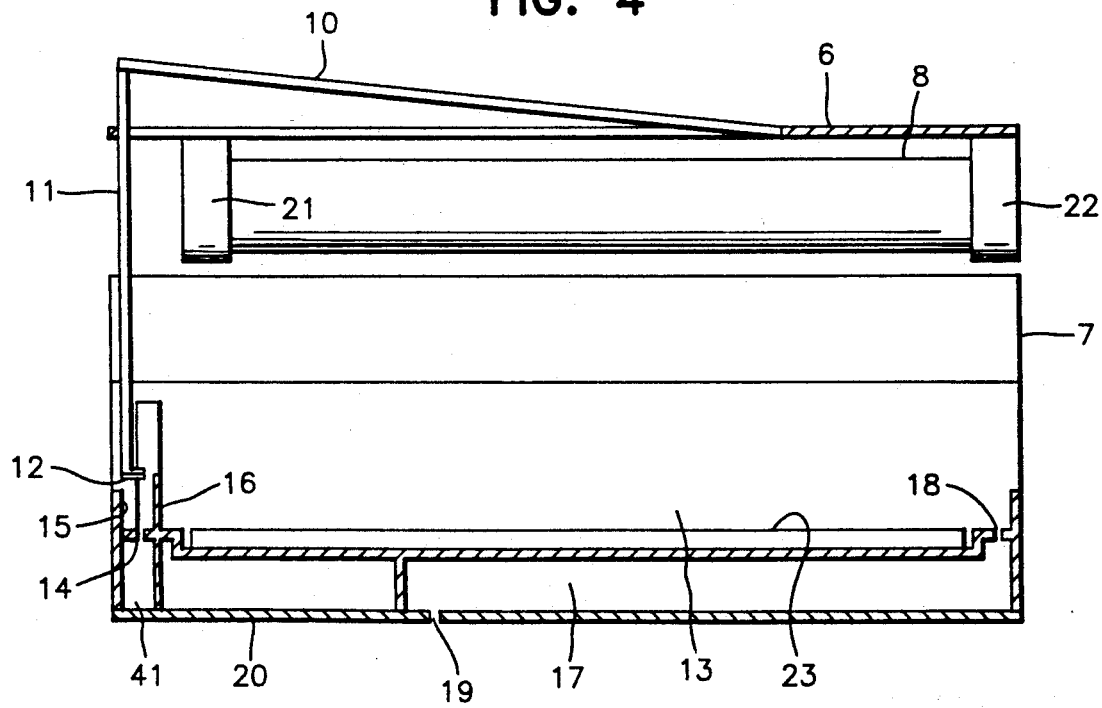
FIG. 4 is a sectional view of the filter cartridge and support bracket.
Figure 2:
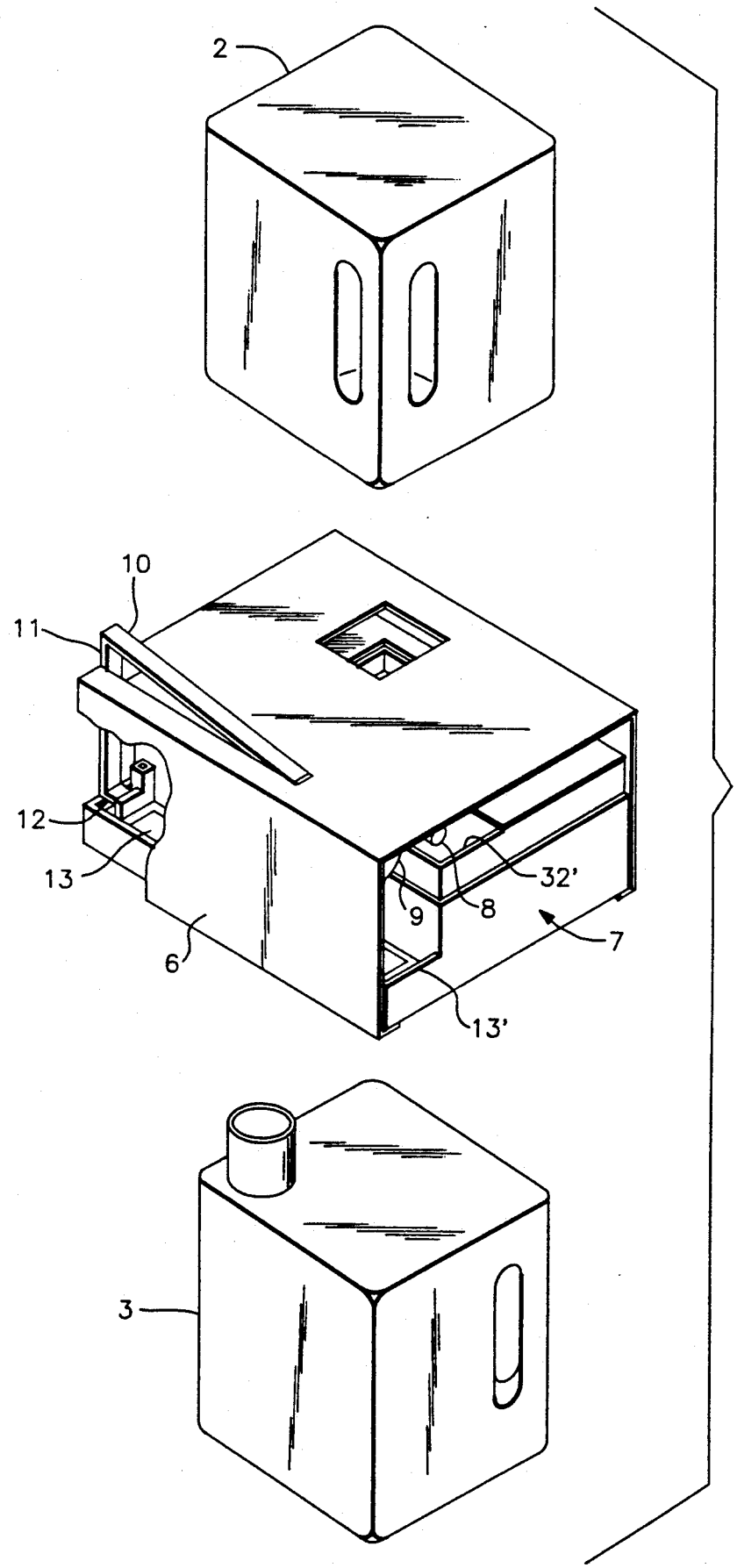
FIG. 2 is an exploded rear perspective view of both bottles, the support bracket and the filter cartridge.
Figures 3, 9:
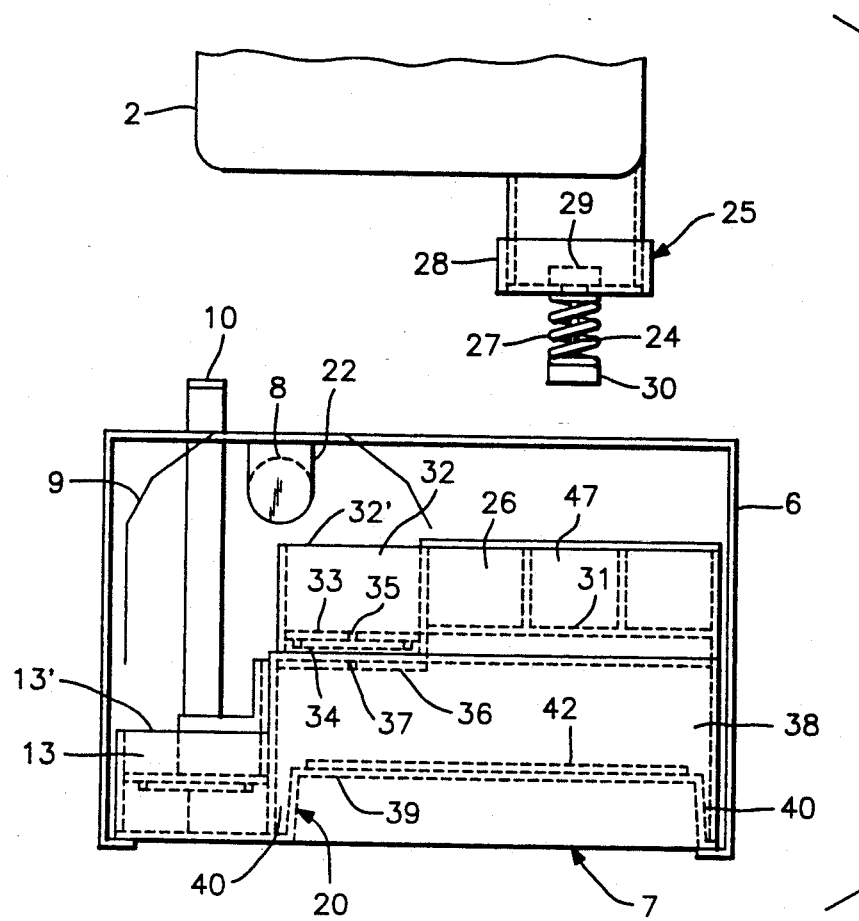
FIG. 3 is a rear view of the filter cartridge, support bracket and a portion of the supply bottle.
FIG. 9 is a fragmental perspective view of the filter cartridge with a floor removed.

FIG. 2 shows the relationship of the supply bottle 2 and collection bottle 3 to a filter support bracket 6 and a filter cartridge 7. Attached to the underside of the top surface of the support bracket 6 is a U.V. lamp 8 and its reflector 9 as illustrated in FIG. 3. The electrical ballast that controls current to the U.V. lamp 8 is attached to the bottommost portion of the support bracket 6 and is not shown in this view. FIGS. 2–4 illustrate the details of an automatic sealing mechanism which includes an operating lever 10 connected through a hinge to the support bracket 6. The opposite end of the lever 10 is connected through a hinge to the sealing bar 11. The bottommost surface of the bar 11 has attached to it a resilient sealing pad 12. When the upper water supply bottle 2 is in place, its weight bears against the operating lever 10, which in turn causes the sealing bar 11 to be urged downward. The sealing pad 12 covers and closes a carefully sized orifice 14 in a lower irradiation compartment 13.

FIG. 4 is a sectional view of the support bracket 6 and the filter cartridge 7 showing how the operating lever 10 and the sealing bar 11 are positioned in relationship to the orifice 14. The operating lever 10 and sealing bar 11 are shown in their normal relaxed position when the upper water supply bottle 2 is not in place; the operating lever 10 is urged upwards by a spring (not shown). The sealing pad 12 is positioned directly over the orifice 14 and is guided into sealing position by a front wall 15 and partial divider 16. A lower media compartment 17 includes an inlet hole 18; and an outlet hole 19 for this compartment is provided in a bottom filter cover 20.

The U.V. lamp 8 and its two electrical sockets, 21 and 22, are shown mounted to the support bracket 6. A lower catalyst support plate 23 is positioned in a shallow depression in the bottom of the lower irradiation compartment 13.

FIG. 3 is a rear end view of the support bracket 6 and filter cartridge 7. A reflector 9 is shown mounted relative to the U.V. lamp 8. This reflector runs the full front-to-back depth of the support bracket 6. A water supply bottle 2 is shown above the support bracket 6 just prior to its being put in place. The left edge of the bottom surface of the bottle 2 is directly above the operating lever 10 which it will depress when put in place. Screwed to the neck of the bottle 2 is an automatic feed cap 25. Its purpose is to maintain a constant water level in an upper media compartment 26 of the filter cartridge 7. The cap 25 contains a poppet valve arrangement that is urged closed by spring 27. A poppet stem 24 passes through a clearance hole in a cap body 28. The top of the poppet stem 24 terminate in a sealing disc 29. This disc bears against the inner surface of the cap body 28 which has been coated with a resilient sealing substance. The bottom of the poppet stem 24 is terminated in an actuation disc 30. When the bottle is in the position shown, the poppet valve is sealed and water in the bottle is prevented from exiting. The length of the neck of the bottle and the dimensions of the cap 25 are such that when the bottle is correctly positioned resting on the support bracket 6, the poppet valve is urged open by a bottom surface 31 of a water inlet compartment 47. The bottom surface of cap body 28 is then slightly below the top edge of the walls that make up the upper media compartment 26. Adjacent to the upper media compartment 26 is an upper irradiation compartment 32. There is a shallow depression on its floor to contain an upper catalyst support plate 33. Directly below the upper irradiation compartment 32 is an intermediate media compartment 34. Communication between these two compartments is through a hole 35 in the floor of the upper irradiation compartment 32. The bottom of the intermediate media compartment 34 is formed by a middle cover 36 which includes a carefully sized orifice 37. Below the intermediate media compartment 34 is a main media compartment 38. The bottom floor of this compartment is formed by the bottom filter cover 20 of the filter cartridge 7. A molded dome 39 in the cover raises the floor of the main media compartment 38 so that this floor is higher than the floor of the adjacent lower irradiation compartment 13. The plan view dimensions of the dome are slightly less than the internal dimensions of the main media compartment 38. This results in there being formed a narrow collection trough 40 around the outer circumference of the dome. This trough leads to a collection well 41, shown in FIG. 4 and in greater detail in FIGS. 5-7 and 9. The top of the dome 39 has on it raised ribs 42, (see FIG. 8). These ribs support filter paper (not shown). This paper is to trap any particulate matter from the media bed above it. The ribs are shown as parallel and evenly spaced in FIG. 8. This is for illustration purposes only. The actual configuration of the ribbing will be determined by the flow characteristics of the media above. The ribs will act to guide flow from the media bed above and lead it to the circumferential collection trough 40. This flow control will ensure that the media bed is fully utilized.

Figure 5:
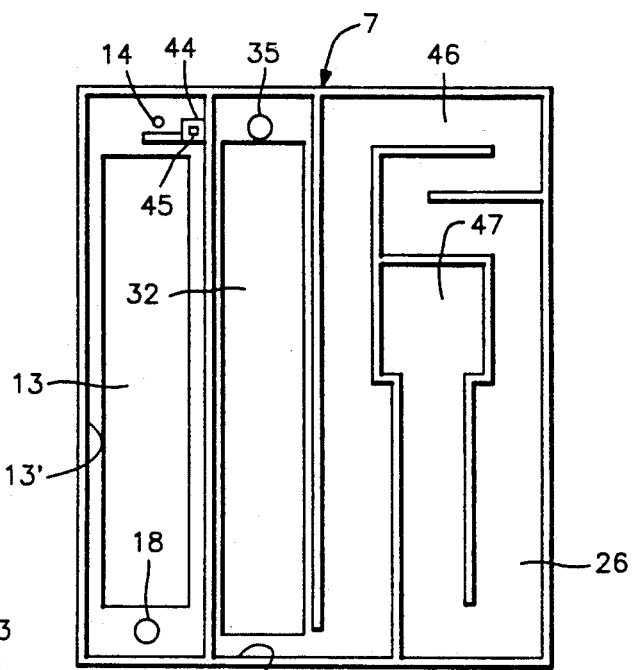
FIG. 5 is a top view of the filter cartridge with its top cover removed.

FIG. 5 is a top view of the filter cartridge 7 with a top filter cover 43 (see FIG. 8) removed showing the layout of the upper media compartment 26 with orifice 14 and inlet hole 18, both located on the floor of lower irradiation compartment 13, being shown. An outlet hole 35 from the upper irradiation compartment 32 and a standpipe 44 with its axial hole 45 are also shown. The axial hole 45 extends downward into the collection well 41. Its upper extent is to just below the level of the bottom surface of the middle cover 36. A labyrinth 46 which divides up the upper media compartment 26 is shown along with the water inlet compartment 47.

Figure 6:
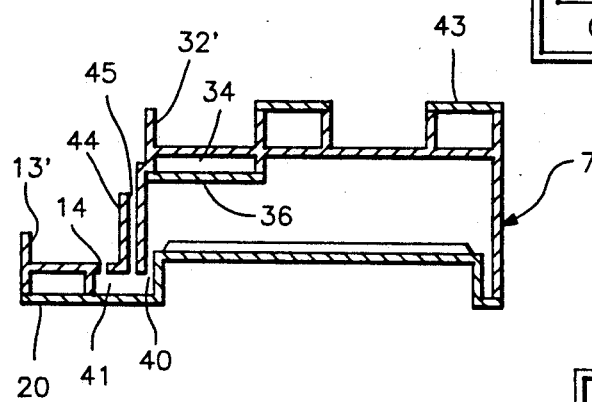
FIG. 6 is a sectional view of the filter cartridge.

FIG. 6 is a transverse sectional view of the filter cartridge 7. The top filter cover 43, middle cover 36 and bottom filter cover 20 are shown in place (see FIG. 8). The collection well 41 is shown in cross-section with the collection trough 40 leading into it. The two outlets for the collection well 41 are the orifice 14 and the axial hole 45 associated with the standpipe 44.

Figure 7:
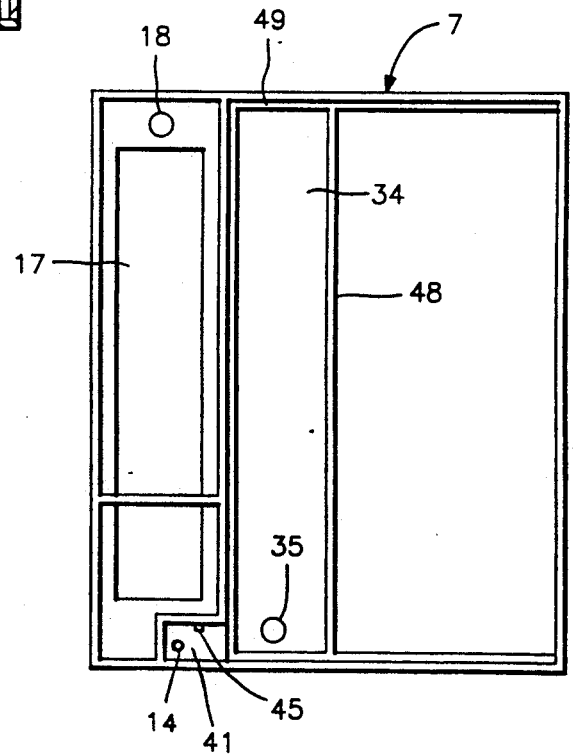
FIG. 7 is a bottom view of the filter cartridge with the bottom cover removed.

FIG. 7 is a bottom view of the filter cartridge 7 with the bottom filter cover 20 and middle cover 36 removed. The outlet hole 35 from the upper irradiation compartment 32 is shown. It leads into the intermediate media compartment 34. The lower media compartment 17 is shown along with its inlet hole 18. The mounting surface for the middle cover 36 is formed by a vertical rib 48 and a step 49 molded into the filter housing. The two outlets from the collection well 41 are the axial hole 45 and the orifice 14.

Figure 8:
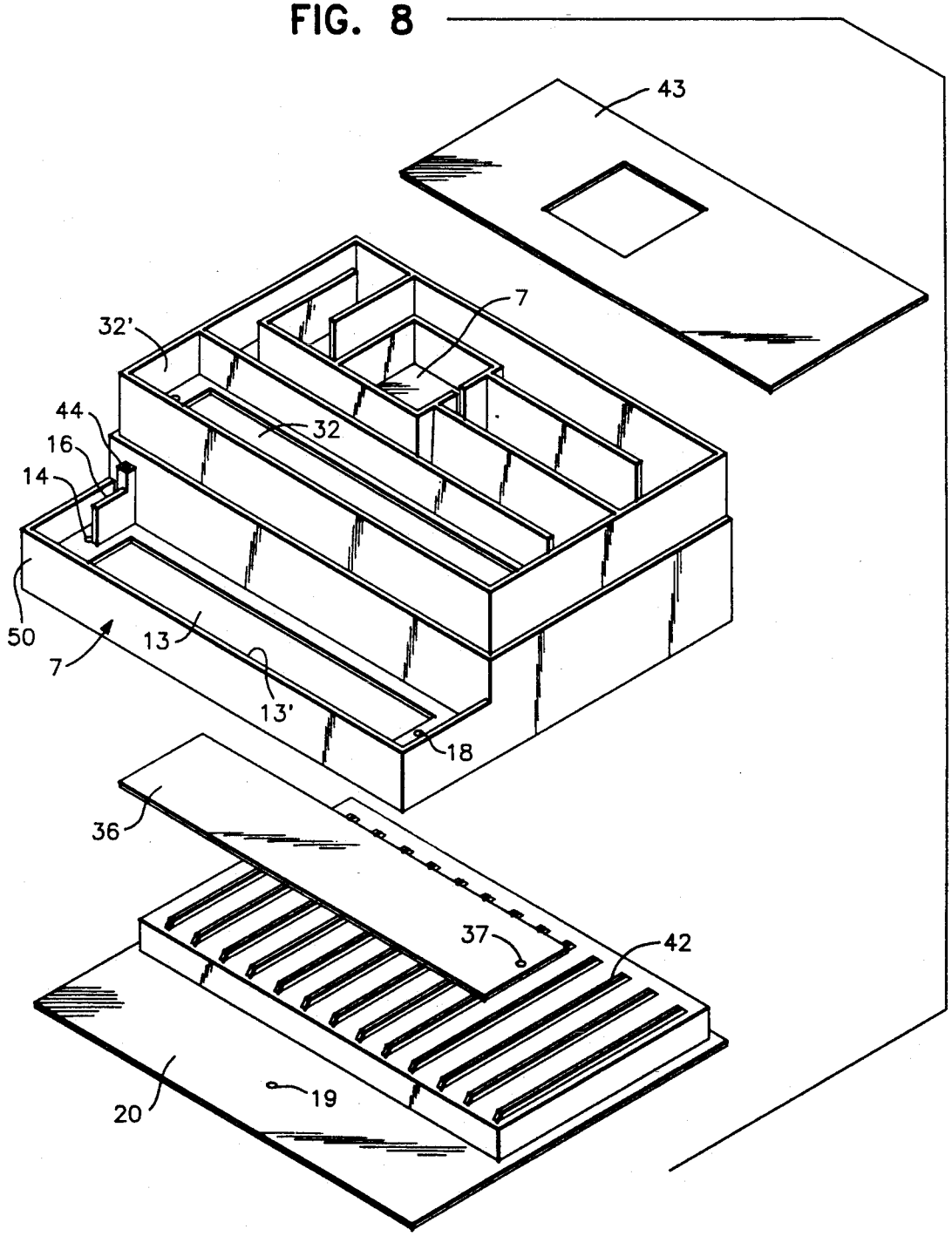
FIG. 8 is an exploded perspective view of the filter cartridge.

FIG. 8 is an exploded view showing the four molded plastic pieces that make up the cartridge filter 7 which includes a filter cartridge housing 50, top filter cover 43, bottom filter cover 20, and middle cover 36. The bottom filter cover 20 has in it an outlet hole 19 which directs the purified water to the waiting water collection bottle 3 placed underneath. The middle cover 36 has molded into it an accurately dimensioned orifice 37 which is sized to precisely meter flow from the intermediate media compartment 34. The hole in the top filter cover 43 is positioned to align with the water inlet compartment 47. FIG. 8 provides a better view of the lower irradiation compartment 13, the inlet hole 18 to the lower media compartment 17, the standpipe 44, the partial divider 16, and orifice 14. The shallow depression in irradiation compartment 13 that will position the lower catalyst support plate 23 is also shown.

FIG. 9 is a fragmental perspective view with the floor of the lower irradiation chamber removed so that it is clearer how the collection well 41 is formed. The height of the removed floor is indicated by the dot-dash lines. To form the collection well 41, the partial divider 16 is extended downward until it touches the bottom filter cover 20. A small right angle extension from the divider then joins to the front wall 15, forming an enclosed pocket. Part of the collection trough formed by the bottom filter cover 20 and a vertical wall of the filter cartridge housing is shown. This trough leads to the collection well 41. A cross rib 51 that forms one side of the lower media compartment 17 is shown next to the outlet hole 19.

DESCRIPTION OF OPERATION

Water purification in this invention is a batch process. The filter cartridge is designed so that there is maximum contact time between the water and the purifying media. Flow control orifices are placed at strategic points so that the media compartments are flooded for the major portion of the purification cycle. This ensures the most intimate contact between the water and the media. These flooded compartments are automatically drained at the end of the purification cycle.

The type of media and its quantity has been selected to treat a water containing particular contaminants. These are contaminants that have been specifically identified by the National Sanitation Foundation (NSF) and the United States Environmental Protection Agency (USEPA) as being especially health threatening. The filter cartridge is sized so that it will treat a certain quantity of water and reduce the level of these particular contaminants to below the "Maximum Contaminant Level" (MCL) as determined by the USEPA for potable water. It is virtually impossible to reduce a contaminant to a zero level because of increasingly sophisticated measuring techniques, so the goal of this invention is to, at a minimum, reduce levels to below the MCL. The particular sequencing of purifying media and U.V. photoactivated catalyst is structured to achieve this goal. Lists of harmful contaminants are periodically updated by the NSF and EPA. This may necessitate altering media type and quantity. This can be done without deviating from the spirit of this invention.

The purifying media fall into several categories: activated carbon for the removal of organics; ion exchange resins as a source of particular ions or functional groups; minerals as a source of particular ions; photoactivated catalyst for its oxidative properties. The following is a listing of the media compartments, what media they contain and what contaminants they are expected to eliminate.

The upper media compartment 26 includes an initial 5 micron filter to eliminate particulate matter, asbestos fibers and cysts, a first medium to contact water which consists of the sulfate form of an anion resin, typically 150 ml of the anion resin sold under the trademark IONAC A-641 or a similar resin. This will precipitate barium (in $Ba^{+2}$ form) as barium sulfate and a second medium contacted by water is 50 ml of the arsenate form of activated alumina such as sold by Alcoa under the trademark F1 or a similar activated alumina. This will precipitate cadmium (as $Cd^{+2}$ form) and lead (as $Pb^{+2}$ form) as cadmium arsenate and lead arsenate respectively.

The upper irradiation compartment 32 includes photoactivated $TiO_2$ which oxidizes metals to higher states. Trivalent arsenic is raised to $As^{+6}$ (arsenate form). Selenium and chromium are raised to selenate and chromate forms. Mercury is oxidized to HgO. Organic compounds are oxidized and reduced to simpler forms. Nitrites are raised to nitrates. Volatile organic compounds leave water due to large exposed surface. Bacteria are killed or destroyed.

The intermediate media compartment 34 includes an initial filter to remove any insoluble metal oxides formed above, 5 ml of aluminum form cation resin such as sold under trademark CFP-110 or a like compound for the removal of selenate as aluminum selenate, 20 ml of lead form CFP-110 cation resin for the removal of chromate as lead chromate, 5 ml of calcite ($CaCO_3$) to precipitate arsenate as calcium arsenate. Any arsenate that existed prior to this final precipitation would have aided in the precipitation of lead, especially those trace amounts leached from the lead form cation resin immediately preceeding; and a final filter to capture the metal precipitates formed and to protect the upper flow control orifice from clogging.

The main media compartment 38 includes 375 ml of a nitrate selective anion resin such as chloride form sold under trademark SR-6 or a similar anion resin. The nitrate is captured and chloride is released. A final filter is provided to capture any particulate matter that might clog the lower flow control orifice.

The lower irradiation compartment 13 includes photoactivated $TiO_2$ for further oxidation of organics and any trace compounds that may have leached from the resins above. Any bacteria still present will be destroyed before water is introduced to the final media compartment.

The lower media compartment 17 includes 50 ml of activated carbon for the removal of residual organic material and some trace inorganic material such as lead, cadmium and mercury which may have escaped capture above. A final filter is provided for the removal of carbon fines and media particles.

The above processing steps are directed to the National Sanitation Foundation's booklet ANSI/NSF 53-1988 titled "Drinking Water Treatment Units-Health Effects". All contaminants, except fluoride, which are found in this booklet will be dealt with, and the resulting levels of contamination will be below the MCL. Fluoride problems are regional and may be addressed, if so desired, without deviating from the spirit of the invention.

It will be noticed that the ion exchange resins are used somewhat differently than is normally the case (except for the nitrate selective anion resin). Typically, an ion exchange resin is designed to capture a certain ion. During this capture an ion that had been bonded to the resin is displaced and enters the effluent. This ion has no particular value and its presence in the effluent is accepted as merely a consequence of the capture of the target ion. In the subject filter, the ions initially bonded to the resins are the important ones; they will be used to form precipitates with the target contaminant ions. In other words, the resins have not been selected on the basis of what they will capture but what they will provide. Any capturing of ions will only be in the nature of a secondary benefit. As an example, the first medium is a sulfate form anion exchange resin. It has been selected to provide the sulfate anion to barium (Ba+2) so that barium sulfate will form as a precipitate. The precipitate has a solubility-product constant ($K_{sp}$) of $1.08 \times 10^{-10}$ which characterizes it as a relatively insoluble compound. By definition, a solubility-product constant consists of the product of the concentrations of two species (in the units of moles per liter) in a saturated solution. The higher that we establish the sulfate concentration, the lower the barium concentration will be. The resin will provide a high sulfate concentration to the solution that surrounds it. Accordingly, the barium in solution will be very low (well under MCL levels). The necessary concentration of sulfate ions is developed as a consequence of their displacement by any other anions that exist in the raw water being processed. Most natural waters—and this includes tap water—are fairly highly loaded with both cations and anions. It is these pre-existing cations and anions that are being called upon to displace the desired anions and cations from the resins.

The calcite ($CaCO_3$) functions in a similar manner. It slowly dissolves in the water and provides $Ca^{+2}$ ions so that relatively insoluble calcium arsenate ($K_{sp}=2.2\times10^{-33}$) may be formed.

Another basis for resin selection is that the resins themselves should not introduce harmful products into the water. The sulfate form anion resin meets this requirement since sulfate is relatively innocuous. It is objectionable in water primarily because of aesthetic effects and very high levels (250 mg/L) are tolerated before taste or odor becomes a problem. Such naturally occurring levels would by themselves reduce barium to an acceptable level.

The lead form cation resin and arsenate form activated alumina are potential sources of harmful ions, but due to the sequencing of media and the solubility products of compounds containing lead and arsenate, virtually no lead or arsenic will be released to the water. Any lead released from the resin over and above that needed to form lead chromate ($K_{sp}=1.8\times10^{-14}$) will be bound up with the arsenate released from the arsenate form of activated alumina and that arsenate formed when lower valence arsenic is oxidized by the photocatalyzed $TiO_2$. Any remaining arsenate will then, subsequently, be bound up by the calcium provided by calcite. The solubility product of calcium arsenate is an extremely low $2.2\times10^{-33}$.

The filter contains two irradiation compartments where a photoactivated catalyst is employed to both oxidize and reduce certain compounds. Both compartments are open to atmosphere and are supplied with U.V. energy from a common lamp. A reflector above the lamp concentrates this U.V. light. It is preferentially constructed of polished pure aluminum since this material has a demonstrated ability to reflect ultraviolet light. The light shines onto plates covered with a catalyst particularly sensitive to U.V. Water to be treated is then allowed to flow over these plates. In the preferred embodiment, these plates are glass or ceramic substrates to which has been bonded the anatase form of titanium oxide ($TiO_2$). Other catalysts which can be used in the invention are ZnO, CdS, $WO_3$, and $SnO_3$. The anatase form of $TiO_2$ is clearly preferred. Also, different grades of $TiO_2$ give significantly different results although they are all of the same anatase form. This invention uses a grade of $TiO_2$ which has been found to be particularly effective sold by Degussa Corporation under trademark #P-25. This comes in the form of an extremely fine powder which is then bonded to the substrate by one of two methods: electrostatic bonding or bonding using the sol-gel process. Electrostatic bonding is the simpler of the two: a finely dispersed mixture of $TiO_2$ in water or alcohol is allowed to cover the substrate, and the water (or alcohol) is allowed to evaporate—sometimes employing gentle heat or a vacuum. A thin coating of $TiO_2$ remains on the substrate, bound to it by electrostatic forces. A more tightly bound coating is achieved by employing the sol-gel process. This process for applying $TiO_2$ to a substrate is well known in the art. A titanium alkoxide such as titanium (IV) isopropoxide, $Ti[OCH(CH_3)_2]_4$, has been used for years to develop films of $TiO_2$ onto glass or to bind particles of $TiO_2$ together. In the preferred embodiment of this invention, the sol-gel process will be used to bind particles of Degussa Corporation #P-25 $TiO_2$ to a ceramic substrate. Further, the bonding of the catalyst to the substrate need not be overly strong. If some catalyst should be dislodged from the substrate because of flowing water or other disturbances, there would be no decrease in organic destruction rate as long as a surplus of catalyst was initially applied; small loses of catalyst would not affect performance. In fact, it is believed that a certain controlled dislodgment may be desirable. Only extremely small quantities of $TiO_2$ are believed needed in suspension to ensure organic destruction. This is partially due to the small size of each $TiO_2$ particle—only 30 nm (nanometer) in diameter in the case of Degussa #P-25; the smaller the particle, the greater the ratio of surface area to weight. In laboratory experiments, 6 mg/liter of finely suspended $TiO_2$ was adequate to destroy 38 ppm oxalic acid completely. In a subsequent test, this $TiO_2$ laden water was replaced with pure deionized water to which was added an additional amount of 38 ppm oxalic acid. After a brief period, organic destruction began to be seen again, which suggested that some residue of $TiO_2$ remained from the previous test due to inadequate cleaning and that the trace amount, although invisible to the naked eye, was sufficient to destroy oxalic acid at a rate of 0.42 milligrams per minute.

The U.V. source in accordance with the present invention should preferably have an output of what is normally termed "blacklight". This is a longer wavelength U.V., almost into the visible spectrum. It covers a wavelength range from 320 to 400 nanometers and is also known as U.V.A. This wavelength has photons associated with it that are sufficiently energetic to excite a $TiO_2$ molecule such that an electron will be raised from the valance band to the conduction band. It is this increase of energy level of the electron that gives $TiO_2$ its ability to destroy molecules. This increase in energy is measured in electron volts and is known as an energy gap or band gap. A photon must be able to impart sufficient energy to an electron to overcome this energy gap. Short wavelength photons (and by extension, the U.V.light that includes them) have more energy than longer wavelength photons. $TiO_2$ crystals have an energy gap at room temperature of 3.05–3.8 electron volts. The corresponding wavelengths of light are 407 nm to 327 nm. A U.V. light of 407 nm wavelength would be able to activate only those electrons that would experience a 3.05 electron volt energy gap. Electrons that needed more energy (such as those faced with 3.8 electron volt energy gap) would not be affected. A light of 327 nm wavelength would be able to activate all electrons. For this reason, it is further preferred that the wavelength of U.V. light used, be close to the shortest wavelengths of the blacklight range. This reasoning is consistent with the findings of researchers that showed that wavelengths from 350–400 nm were very effective in activating the anatase form of $TiO_2$. Further evidence of this wavelength dependency is found in "Some Aspects of the Pigmentation of U.V.-curable Systems", J. Oil Col. Chem Assoc. 1976, 59, 245–252, where it was found that the shorter the wavelength, the more the activation of both anatase and rutile forms of $TiO_2$.

Whereas, rutile received no benefits from wavelengths shorter than about 360 nm, anatase (the form preferred for the present invention) showed increasing activity to less than 310 nm. The data suggested that wavelengths even shorter would improve performance. However, there is evidence ("Reactivity of the Hydroxyl Radical in Aqueous Solutions", L. M. Dorfman and G. E. Adams, NSRDS-NBS-46, 197) that the free hydroxyl radical begins absorbing radiation at 300 nm with an increase in absorption at shorter wavelengths. Since this hydroxyl radical is thought to be the main active species generated by the U.V. working on the catalyst, it would seem best to avoid the absorption which could destroy them.

Blacklight has been selected as preferable for a consumer device because these wavelengths do not have the physiological effects of the shorter wavelengths. U.V.A. radiation will produce skin tanning and weak sunburn, while the shorter wavelengths can cause severe burning and blistering. However, with proper safeguards, the wavelength found in inexpensive low-pressure mercury lamps (253.7 nm primarily) can be effectively used notwithstanding its possible negative effect on hydroxyl radicals. This wavelength has the added benefit that it possesses strong germicidal powers.

The present invention preferably uses a low-pressure mercury lamp of 4 watts power. This is compact and relatively inexpensive. Medium pressure mercury lamps may also be used without departing from the spirit of this invention. These lamps are more efficient and have a greater U.V. output but are more expensive and require more expensive power supplies to operate them. Since the quantity of organics destroyed is a function of total photon output rather than photon rate, a long treatment time is planned for this invention, and the higher output of medium-pressure lamps is not necessary.

The 4 watts stated above is a nominal wattage of power consumed by the lamp. The actual usable power developed in the ultraviolet range is approximately 10–20% of this. If higher U.V. outputs are required, it is possible to run multiple lamps together or to use a U-shaped lamp that allows more power to be put into a smaller overall length.

Both irradiation compartments are open to atmosphere. This offers several advantages. Firstly, any volatile organic compounds present in the water will have the opportunity to diffuse to the water surface and be dissipated into the atmosphere. This lessens the loading on the organic destruction media. Secondly, an exposed water surface allows oxygen from the atmosphere to be dissolved into the water. This oxygen is required to form the various oxyanions—arsenate, selenate, etc.—mentioned above. It is also required for the full mineralization of certain chlorinated hydrocarbons such as dichloro and trichloromethane (tetrachloromethane, $HCl_4$, does not require oxygen for complete destruction). Oxygen also aids in the generation of free hydroxyl radicals. Mobile electrons are created when a positive-hole electron pair is generated by the photoactivated catalyst. It is believed that these mobile electrons react with $O_2$ to give the superoxide radical and the perhydroxyl radical. Both of these radicals can react further to form $H_2O_2$ which subsequently decomposes to the free hydroxyl radicals desired. Formation of the superoxide radical is also important for another reason: it captures the mobile electron and, therefore, delays the recombination of it and the adjacent positive hole. This destructive recombination should be avoided since the positive hole is a strong oxidizing species for molecules and ions, as well as the primary means for forming free hydroxyl radicals from OH⁻ ions.

The filter cartridge is designed for easy replaceability. Following a period of useful life, it is thrown away. It is desirable but not necessary for the purposes of this invention that a counting mechanism be added so that the user will be alerted as to proper filter replacement time. This mechanism can simply be actuated by the operating lever 10 which is depressed each time a new bottle of water is to be treated. The counting mechanism can then cause the indicating lamp 5 to be illuminated.

It is obvious that the filter cartridge must be periodically replaced since the media trap various contaminants and certain active chemicals in the media are depleted. The catalyst, theoretically, is not "used up", however, its activity can be greatly diminished by surface contaminants. Experiments by researchers have shown that waters containing humic acids (common with surface water sources) tend to deposit a yellow-brown film onto the catalyst surface. This film decreases the photoactivity of the catalyst. Even the addition of high quality pre-screen filters will not guarantee that the catalyst will retain its catalytic properties. In fact, by making the catalyst replaceable, the need for elaborate pre-screening (as is done in other catalystic destruction systems) is eliminated.

A simple operation cycle of the purifier is as follows. An empty water collection bottle 3 is placed into housing 1. A water supply bottle 2 filled with water to be treated and sealed with the automatic feed cap 25 is lowered into the top opening of housing 1. Operating lever 10 is depressed by a surface of bottle 2. The sealing bar 11 is urged downward causing the sealing pad 12, attached to its lower extremity, to seal orifice 14. The only remaining exit for water from collection well 41 is now hole 45 of standpipe 44.

Simultaneously as the operating lever is being depressed, the neck of bottle 2 and its associated cap 25 are entering the water inlet compartment 47. The actuating disc 30 then bears against the bottom surface 31 of water inlet compartment 47. Sealing disc 29 is urged upward by poppet stem 24, and the poppet valve is now open. Water now discharged from the supply bottle 2 through the discharge outlet in the cap 25, while air enters the bottle through the same outlet. The entering of air is necessary in order to displace the water being discharged; if air could not enter, water could not discharge. This is a well-known principle of this type of water level control mechanism.

Water now begins to flow through the labyrinth area 46 of the upper media compartment 26. As mentioned earlier, it first contacts a fine particulate filter and then enters the area occupied by the two purification media in this compartment. The discharge outlet in cap 25 is sized so that the water flow rate is only slightly greater than 0.25 liters per hour. This ensures that this initial quantity of water is in contact with the media long enough for an effective chemical reaction to occur; later when the upper media compartment 26 is flooded, a long contact time is guaranteed through the throttling effect of orifice 37. This orifice is sized so that, preferably, the flow rate through it will be 0.25 liters/hour. Because its flow rate is lower than the flow rate associated with the cap 25, it becomes the governing flow control device.

As water leaves the labyrinth of the upper media compartment, it enters the upper irradiation compartment where it is exposed to the U.V. photoactivated catalyst. The water travels down the entire length of the upper catalyst support plate 33 and exits through a large hole 35 into intermediate media compartment 34. There it encounters first a particulate filter and then the three purifying media in that compartment. Finally, after passing through a second filter, it comes to orifice 37 in middle cover 36. This orifice, because of its small size, begins to impede flow so that first the intermediate media compartment 34 becomes flooded followed by the upper irradiation compartment 32, the upper media compartment 26, and the water inlet compartment 47. The water level in the water inlet compartment 47 rises until the upper surface of the water contacts the cap body 28. At this point, the water effectively seals against any further entry of air into the bottle. As explained above, water now ceases to flow from the bottle and a water level is established in inlet area 47. As water is drawn away from the inlet area through the labyrinth and the water level begins to fall, the lower surface of cap body 28 is uncovered and, once again, air is allowed to enter the bottle with a corresponding discharge of water. The cycle is repeated so that a constant level of water is maintained throughout the upper media compartment 26 and the upper irradiation compartment 32. This flooding of the purifying media ensures an intimate contact between the water and the active chemicals, while the low flow rate ensures adequate contact time.

Water leaving the intermediate media compartment 34 through orifice 37 enters the main media compartment 38. It travels downward through the media bed to the filter that forms a floor for this bed. Passing through the filter, the water enters the area between the ribs 42 that are part of the molded dome 39 of the cover 20. The water then flows outward to the collection trough 40. The trough is formed due to the slight existing clearance between the dome 39 and the vertical walls of the filter cartridge housing 50. The collection trough 40 leads to collection well 41. This well has two available outlets: orifice 14 and hole 45. Orifice 14 which is identical in size to orifice 37 is sealed by sealing pad 12 at this time so that the hole 45 in standpipe 44 is the only allowable outlet for water from collection well 41. The height of standpipe 44 is such that its upper outlet is at a level just below middle cover 36 and just above the level of the media bed in main media compartment 38. This arrangement assures that the main media compartment is fully flooded before any water exits through hole 45. The ribs in the drawing are shown as being parallel and evenly spaced. This is for illustration purposes. The actual ribbing pattern will probably change to accommodate the flow characteristics of the media above. The ribs are meant to direct the flow through the media bed so that all portions of the bed will have equal exposure to the water.

When the main media finally becomes flooded, water begins to flow out of hole 45 in standpipe 44. It flows down into the lower irradiation compartment 13 where it passes over the lower catalyst support plate 23 before exiting through the inlet hole 18 to the lower media compartment 17. It passes through the activated carbon media and finally through a final filter before exiting through hole 19 in bottom cover 20. At this point, the treated water is collected by water collection bottle 3 which is directly underneath.

The above process continues until the user of the appliance notices that the water supply bottle 2 is completely empty. At this time, the upper media compartment 26, upper irradiation compartment 32, intermediate media compartment 34 and main media compartment 38 are all flooded. If the user elected to do nothing, the upper compartments would drain through orifice 37 so that only the main media compartment would remain flooded. Flow from this compartment would cease when the water level in it dropped to the level of the standpipe hole 45, and the lower irradiation compartment 13 and the lower media compartment 17 would continue to drain until they were empty.

It is expected, however, that the user will notice that the supply bottle 2 is empty in some reasonable time after it is and remove it from the housing 1. This removal will allow the operating lever 10 to be urged upward by a spring (not shown) and cause the sealing pad 12 to unseal orifice 14. This orifice communicates directly with the collection well 41. It is at the same level as the bottom surface of the lower irradiation compartment and will allow the contents of the main media compartment 38 to drain slowly through the irradiation compartment. Draining will continue until the main media compartment is completely drained. The only liquid remaining in the filter 7 is that which is left in the collection trough 40 and the collection well 41. By proper design, this volume can be much smaller than it would appear to be indicated by the attached drawings—and should not exceed just a few milliliters. Since orifice 14 is the same size as orifice 37, flow rates will be comparable. This ensures that all the water passing through the filter will have fairly equivalent exposure times to both the media and the U.V. irradiation.

The capacity of each bottle is approximately 1.5 liters in the preferred embodiment. This, coupled with the orifice flow rates of 0.25 liters/hour, will result in an overall process time of somewhere between 6 and 8 hours, depending on the particular density and draining characteristics of the purification media.

The flooded system in the filter ensures that the contact time is long and that all of the media gets wet. If water wets only the top of the media by using a spreader plate with many tiny holes in it, even distribution would not be obtained and not all portions of the media would be evenly used. This problem is well known in drip coffee makers where the spreader plate used doesn't allow consistant extraction from the coffee grounds. The user here just adds more coffee to compensate. Channelling also occurs where the water takes preferred paths vertically and not all of the coffee is evenly extracted. The same effect occurs with any medium.

Contact time is determined by how long it takes for a "particle" of water to go from the top of the media to the bottom. To increase that time, the media can be ground finer, but this is not possible with all media since some is relatively coarse and must stay that way. Alternatively, the water can exit from the media through a small orifice. This allows a longer contact time as long as the water flow rate coming into the filter is greater than the outlet rate. The filter might eventually flood in this case, and a long contact time is obtained but at the price of a potential overflow problem. If the input rate of water is limited, a low flow rate is obtained but a long contact time is still not obtained. Even if water is added a drop at a time, the drop quickly passes to the bottom of the media since the media porosity controls the time from top to bottom.

In the compact filter design with limited vertical height as disclosed, the flooded system with the water being led away from the bottom through a vertical standpipe, as disclosed, gives long contact time and complete wetting. The only problem left is how to drain the filter because the water left in the filter compartment is a significant portion of the water being treated. The automatically operated valve as disclosed effectively drains the flooded filter system when the supply container is removed. This provides a significant consumer convenience.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A water purification system comprising container means forming an untreated water supply means, filter means located below and communicated with and receiving untreated water by gravity flow from the untreated water supply means and container means forming a treated water receiving means located below and communicated with and receiving treated water by gravity flow from the filter means, said filter means comprising a plurality of separate compartments in fluid communication arranged in a series relation to form a flow path through the filter means, each separate compartment including a distinct type of purification media therein, one of said compartments containing a purification media in the form of a photoactivated catalyst, ultraviolet light means located in said one compartment for activating said catalyst, said one compartment having an open top area exposed to atmosphere for oxygenating the water being treated for aiding in contaminant destruction and improving the taste of the treated water and allowing volatile compounds in the water to be driven off, said compartments including an upper purification media compartment receiving untreated water from the untreated water supply means, said one compartment having the photoactivated catalyst therein communicating with the upper media compartment, an intermediate purification media compartment communicated with said one compartment, a main purification media compartment communicated with said intermediate purification media compartment, a lower irradiation compartment in communication with said main purification media compartment, said lower irradiation compartment including a photoactivated catalyst, said ultraviolet light means in said one compartment activating said catalyst in the lower irradiation compartment, and a lower purification media compartment in communication with the lower irradiating compartment.

2. The system as defined in claim 1 wherein said separate compartments includes flow control orifices controlling rate of flow of treated water through the filter means for establishing a low flow rate through the filter means for maximum effectiveness.

3. The system as defined in claim 1 including a housing supporting and receiving the untreated water supply means, filter means and treated water receiving means, said housing including means removeably supporting said filter means for enabling replacement of the purification media.

4. The system as defined in claim 1 wherein said catalyst is photoactivated $TiO_2$, said catalyst being in the form of a coating on a plate positioned for untreated water to flow over the plate and in a position for activation by said ultraviolet light means.

5. The system as defined in claim 1 wherein said upper media compartment includes an initial filter to eliminate particulates, a first purification media to contact water including the sulfate form of an anion resin and a second purification media contacted by water including the arsenate form of activated alumina.

6. The system as defined in claim 1 wherein said intermediate media compartment includes an initial filter for removing insoluble metal oxides, a purification media including aluminum form cation resin for the removal of selenate as aluminum selenate, a purification media of lead cation resin for the removal of chromate as lead chromate, purification media including calcite for precipitating arsenate as calcium arsenate and a final filter for capturing metal precipitates.

7. The system as defined in claim 1 wherein said main media compartment includes purification media including nitrate selective anion resin and a final filter for capturing any particulate matter.

8. The system as defined in claim 7 wherein said lower irradiation compartment is open to atmosphere and includes a plate coated with said catalyst, said catalyst being a photoactivated $TiO_2$ for further oxidation of organics and any trace compounds leeched from previous resins and killing any residual bacteria.

9. The system as defined in claim 8 wherein said lower media compartment includes a purification media of activated carbon for removal of residual organic material and any trace inorganic materials, and a final filter for removal of carbon fines and media particles.

10. The system as defined in claim 1 wherein said untreated water supply means includes a portable, refillable container, said treated water receiving means including a portable container, housing means for said containers and filter means with the containers being removeably supported on the housing means, said housing means including control means supplying electrical energy to said ultraviolet light means for controlling operation of the water purification system for enabling the water purification system to be positioned at a point of use.

11. The system as defined in claim 10 wherein said filter means includes a removeable, disposable filter cartridge mounted on said housing means below the untreated water container and above the treated water receiving container.

12. The system as defined in claim 10 wherein said filter means includes an orifice to control flow of water from the filter means, and sealing means for said orifice, said sealing means including an actuator means engaged by the water supply container means when supported on the housing means for closing the orifice, said actuator means being disengaged by the water supply container means when removed from the housing means for opening the orifice to drain all water from the filter means.

13. The system as defined in claim 12 wherein closing of the orifice by said sealing means causes flooding of said filter means, said filter means also including discharge means operative when said orifice is closed to discharge treated water from the filter means which is in excess of that needed to maintain the filter means flooded.

14. A water purification system comprising container means forming an untreated water supply means, filter means located below and communicated with and receiving untreated water by gravity flow from the untreated water supply means and container means forming a treated water receiving means located below and communicated with and receiving treated water by gravity flow from the filter means, said filter means comprising a plurality of separate compartments in fluid communication arranged in a series relation to from a flow path through the filter means, each separate compartment including a distinct type of purification media therein, one of said compartments containing a purification media in the form of a photoactivated catalyst, ultraviolet light means located in said one compartment for activating said catalyst, said one compartment having an open top area exposed to atmosphere for oxygenating the water being treated for aiding in contaminant destruction and improving the taste of the treated water and allowing volatile compounds in the water to be driven off, said compartments including an upper purification media compartment receiving untreated water from the untreated water supply means, said one compartment having the photoactivated catalyst therein communicating with the upper media compartment, an intermediate purification media compartment communicated with said one compartment, a main purification media compartment communicated with said intermediate purification media compartment, a lower irradiation compartment in communication with said main purification media compartment, said lower irradiation compartment including a photoactivated catalyst, said ultraviolet light means in said one compartment activating said catalyst in the lower irradiation compartment, and a lower purification media compartment in communication with the lower irradiation compartment, said upper purification media compartment including an initial filter to remove particulates, a first purification media to contact water including the sulfate form of an anion resin and a second purification media contacted by water including the arsenate form of activated alumina, said lower irradiation compartment having an open top area exposed to atmosphere for oxygenating the water being treated for aiding in contaminant destruction and improving the taste of the treated water and allowing volatile compounds in the water to be driven off, said intermediate purification media compartment including an initial filter for removing insoluble metal oxides, a purification media including aluminum form cation resin for the removal of selenate as aluminum selenate, a purification media of lead cation resin for the removal of chromate as lead chromate and a purification media including calcite for precipitating arsenate as calcium arsenate and a final filter for capturing metal precipitates, said main purification media compartment including purification media including nitrate selective anion resin and a final filter for capturing any particulate matter, said lower purification media compartment including a purification media of activated carbon for removal of residual organic material and any trace inorganic materials and a final filter for removal of carbon fines and media particles.

* * * * *